3,021,853
CLAMP
Charles D. O'Leary, 103 Churchill Road, McLean, Va.
Filed Dec. 10, 1959, Ser. No. 858,830
5 Claims. (Cl. 135—15)
(Granted under Title 35, U.S. Code (1952), sec. 266)

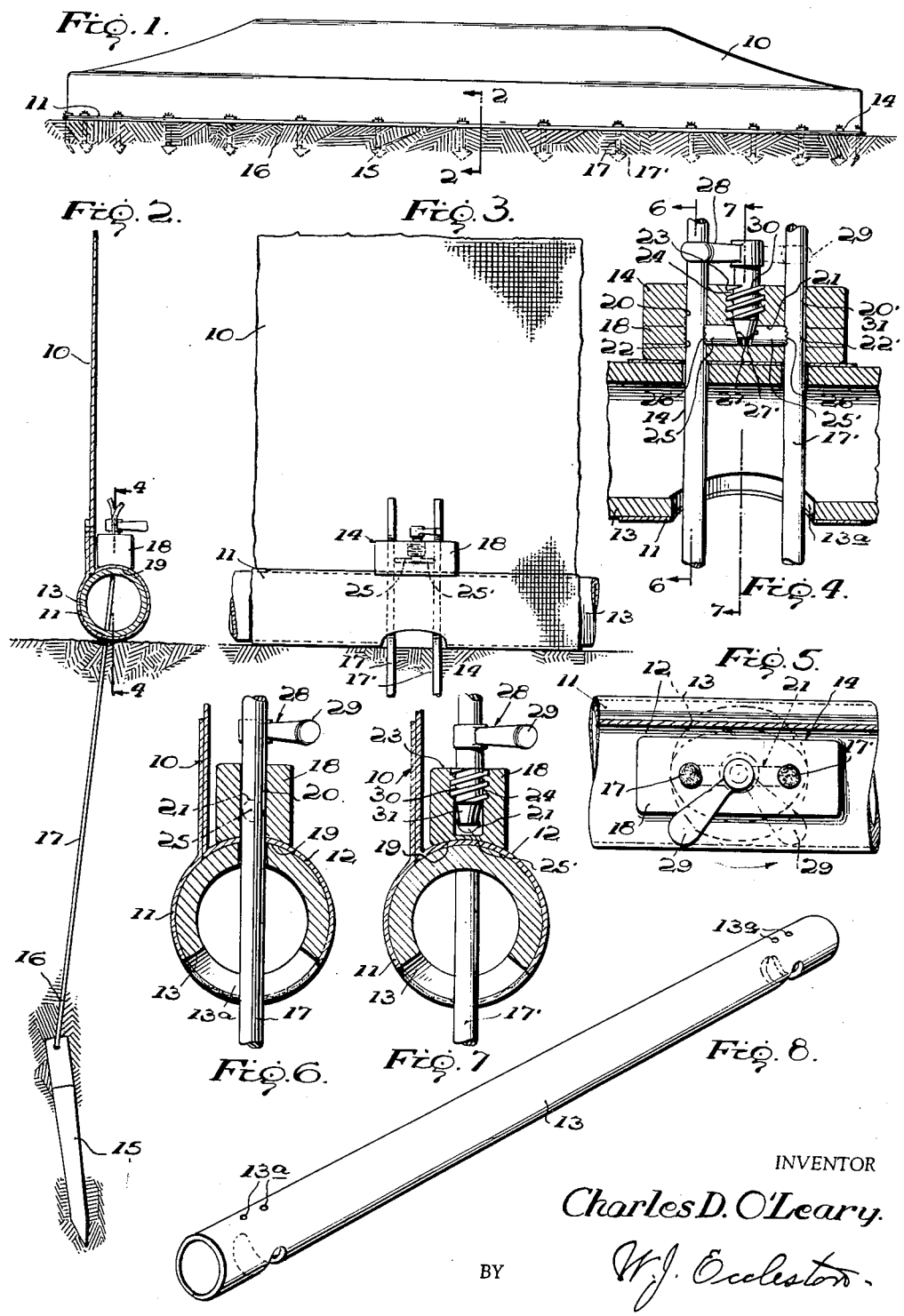

The invention described herein, if patented, may be manufactured and used by or for the Government for governmental purposes, without the payment to me of any royalty thereon.

My invention relates to improvements in line holding clamps, and more specifically to quick release clamps for use in association with ground anchors and ground anchor lines to support inflatable tent structures and the like.

It is an object of my invention to provide a clamp which is readily releasable for use with a ground anchor and the lines carried thereby for supporting an inflatable tent structure or the like.

Another object of my invention is to provide a clamp for holding at least two lines having an elongated operating handle capable of being secured or released by approximately a quarter turn of the same.

A further object of my invention is to provide a line holding clamp which can be readily operated by the foot of the operator.

Other objects and advantages of my invention will be apparent during the course of the following description.

In the accompanying drawing forming a part of this application, and in which like numerals are employed to designate like parts throughout the same:

FIGURE 1 is an elevational view of an inflated tent structure showing the deployment of the ground anchors and the lines carried thereby extending through the bottom portion of the tent and being held by the clamps;

FIGURE 2 is an enlarged fragmentary cross-sectional view taken substantially on line 2—2 of FIGURE 1;

FIGURE 3 is a fragmentary view showing the clamp in the open position;

FIGURE 4 is a fragmentary cross-sectional view of the clamp taken substantially on the line 4—4 of FIGURE 2, showing the clamp in the closed position;

FIGURE 5 is a fragmentary top plan view of the clamp mounted on the sleeve of the tent;

FIGURE 6 is a cross-sectional view taken on the line 6—6 of FIGURE 4;

FIGURE 7 is a cross-sectional view taken on the line 7—7 of FIGURE 4; and

FIGURE 8 is a perspective view of a section of pipe showing the openings through which the ground anchor lines pass.

In the drawing wherein for the purpose of illustration is shown a preferred embodiment of my invention, the numeral 10 designates the tent structure generally which terminates in a sleeve portion 11. Cutouts or slots 12 are provided in the sleeve 11 at regular intervals for the insertion of a length of pipe 13 and the clamp which is generally designated by the numeral 14.

The pipe 13 has a series of pairs of openings 13a extending therethrough and spaced throughout its length (see FIGURE 8). The pipe sections 13 are positioned in the sleeve 11 so that the openings 13a are exposed through the slots 12.

Ground anchors 15 (best seen in FIGURE 2) are driven into the ground 16 in the vicinity of the slots 12 in the sleeve 11, and carry anchor lines 17 and 17' which extend through the openings 13a in the pipe 13 and through the slots 12 in the sleeve 11.

Turning now to the clamp 14, the clamp housing is indicated at 18 and has a concaved base portion 19 conforming to the configuration of the pipe 13 on which it is seated. Anchor line receiving parallel passageways 20, 20' extend vertically through the housing 18, and a horizontal passageway 21 extends between and joins the vertical passageways 20 and 20'.

The inner surfaces of the passageways 20, 20' are serrated as at 22, 22' (see FIG. 4) adjacent the ends of the horizontal passageway 21.

A vertical bore 23 having threads 24 throughout its length is centrally disposed in the housing 18 between the vertical passageways 20 and 20' and joins the horizontal passageway 21 at a point equidistant from each of said vertical passageways 20, 20'. Anchor line clamping bars 25 and 25' are slidably positioned in the horizontal passageway 21. The bars 25, 25' are serrated at one end as indicated at 26 and 26' and terminate in an oblique angle 27 and 27' at the other end. A screw generally indicated at 28 comprises an elongated handle 29, a threaded shank 30 and a tapered end 31 and is threaded in the bore 23 and extends substantially into the horizontal passageway 21. The tapered end 31 wedgingly engages the oblique ends 27, 27' of the bars 25, 25', as seen in FIGURE 4. The threads 24 and 30 are positioned so that a quarter turn of the handle 29 will operate the clamping bars 25, 25' (see FIGURE 5) to engage or disengage the anchor lines 17, 17'.

In operation, when the tent 10 is in position to be inflated, the ground anchor 15 having been driven into the ground 16, and the pipe sections 13 having been inserted within the sleeve 11 so that the openings 13a in the pipe 13 are aligned with the slots 12 in the sleeve 11, the anchor lines 17, 17' are inserted through the openings 13a in the pipe 13 and through the vertical passageways 20, 20' in the housing 18. The openings 13a and the passageways 20, 20' are in vertical alignment as seen in FIGURES 3 and 4, when the housing 18 is seated on the pipe 13. The lines 17, 17' are pulled taut and are clamped in the vertical passageways 20, 20' by the quarter turn of the handle 29 which forces the tapered end 31 of the screw 28 between the oblique ends 27, 27' of the bars 25, 25'. This action forces the bars 25, 25' into the vertical passageways 20, 20' thereby clamping the lines 17, 17' between the serrations 22, 22' on the inner surface of the vertical passageways 20, 20' and the serrations 26, 26' on the ends of the bars 25, 25'. To strike the tent, it is a simple matter for the operator to turn the handle 29 with his foot, thereby releasing the lines 17, 17'.

It is to be understood that the form of the invention herewith shown and described is to be taken as a preferred embodiment of the same, and that various changes in the shape, size, and arrangement of parts may be resorted to without departing from the spirit of my invention or the scope of the subjoined claims.

I claim:

1. The combination with an inflatable tent or the like having a sleeve portion adjacent the ground, said sleeve having a series of spaced openings throughout its length, a pipe positioned in said sleeve having a series of spaced openings registering with said openings in said sleeve, a plurality of ground anchors secured beneath the surface of the ground around the perimeter of the tent, a line carried by each of said ground anchors extending through said openings in said sleeve and in said pipe; of a plurality of readily releasable clamps, each clamp comprising a housing positioned on said pipe, said housing having a passageway therethrough to receive said line, a second passageway communicating with said first-mentioned passageway, and means cooperating with said second passageway to wedgingly clamp said line in said first-mentioned passageway thereby holding said line taut to maintain said housing, said pipe, and said sleeve on the ground when said tent is inflated and to readily release said line when said tent is to be struck.

2. The combination with an inflatable tent or the like having a sleeve portion adjacent the ground, said sleeve having a series of spaced slots throughout its length, a pipe positioned in said sleeve having a series of spaced pairs of openings registering with said slots in said sleeve, a plurality of ground anchors secured beneath the surface of the ground around the perimeter of the tent, two lines carried by each of said ground anchors extending through said slots in said sleeve and said openings in said pipe; of a plurality of readily releasable clamps, each clamp comprising a housing having a concaved base portion conforming to the configuration of the outer surface of the pipe, said housing having two vertical passageways extending therethrough in alignment with the openings in said pipe to receive said two lines, a horizontal passageway connecting said vertical passageways, a threaded bore in the upper portion of said housing centrally disposed between said vertical passageways and extending into said horizontal passageway, a screw having an elongated handle portion, a threaded shank and a tapered end portion threaded in said bore and extending partially into said horizontal passageway, a bar slidably positioned in said horizontal passageway on either side of said tapered end of said screw, each bar having an oblique end to wedgingly engage said tapered end of said screw and the other end having line gripping serrations, and said handle being capable of actuating said screw and said bars to engage and to disengage said lines by approximately a quarter turn of the same.

3. The structure of claim 2, wherein the inner walls of the vertical passageways are serrated adjacent the ends of the horizontal passageway.

4. The combination with an inflatable tent or the like having a lower portion adjacent the ground with a plurality of spaced openings therethrough extending around the perimeter of the tent, a plurality of ground anchors secured beneath the surface of the ground around the perimeter of the tent, at least two lines carried by each of said ground anchors and extending through said openings; of a plurality of ready releasable clamps, each clamp positioned adjacent the ground and resting on said lower portion of said tent comprising a housing having at least two passageways extending therethrough to receive said lines, a third passageway connecting said first and second passageways, a threaded bore centrally disposed between said first two passageways in said housing and extending into said third passageway, a screw having a threaded shank and tapered end portion threaded in said bore and extending partially in said third passageway, a bar slidably positioned in said third passageway on either side of said tapered end of said screw, each bar having an oblique end to wedgingly engage said tapered end of said screw and the other end having line-gripping serrations, and an elongated handle provided at the upper end of said screw actuating said screw and said bars to alternately engage and disengage said lines by approximately a quarter turn of the same.

5. The combination with an inflatable tent or the like having a sleeve portion adjacent the ground, said sleeve having a series of spaced slots throughout its length, a pipe positioned in said sleeve having a series of spaced pairs of openings registering with said slots in said sleeve, a plurality of ground anchors secured beneath the surface of the ground around the perimeter of the tent, at least two lines carried by each of said ground anchors extending through said slots in said sleeve and said openings in said pipe; of a plurality of ready releasable clamps, each clamp comprising a housing positioned on said pipe having at least two passageways extending therethrough to receive said lines, a third passageway connecting said first and second-mentioned passageways, a threaded bore centrally disposed between said first and second-mentioned passageways, a screw having a threaded shank with a tapered end portion threaded in said bore and extending partially into said third-mentioned passageway, a bar slidably positioned in said third-mentioned passageway on either side of said tapered end of said screw, each bar having an oblique end to wedgingly engage said tapered end of said screw and the other end having line-gripping serrations, and an elongated handle provided at the upper end of said screw and protruding above said housing to actuate said screw and said bars to alternately engage and to disengage said lines by approximately a quarter turn thereof.

References Cited in the file of this patent

UNITED STATES PATENTS

| | | |
|---|---|---|
| 425,385 | McKay | Apr. 8, 1890 |
| 1,257,040 | Steuernagel | Feb. 19, 1918 |
| 2,047,637 | Kirsch | July 14, 1936 |
| 2,167,219 | Sankey | July 25, 1939 |
| 2,849,011 | Bird | Aug. 26, 1958 |